Dec. 27, 1938.　　　　J. C. SABEL　　　　2,141,317

LENS MOUNT

Filed Feb. 8, 1937

JOHN C. SABEL
INVENTOR.

BY

ATTORNEYS

UNITED STATES PATENT OFFICE 2,141,317

LENS MOUNT

John C. Sabel, Rochester, N. Y., assignor to Bausch & Lomb Optical Company, Rochester, N. Y., a corporation of New York Application February 8, 1937, Serial No. 124,561

5 Claims. (Cl. 88—57)

The present invention relates to mounts for optical systems and more particularly to mounts which are oil and moisture proof.

One of the objects of the present invention is to provide a new and improved mount for optical systems which mount is both simple in assembly and construction and efficient and accurate in use. Another object is to provide a lens mount which is both oil and moisture proof. A further object is to provide a new and improved system for the mounting and securing of cylindrical lenses. These and other objects and advantages reside in certain novel features of construction, arrangement and combination of parts as will hereinafter be more fully set forth and pointed out in the appended claims.

Referring to the drawing.

Figure 1:
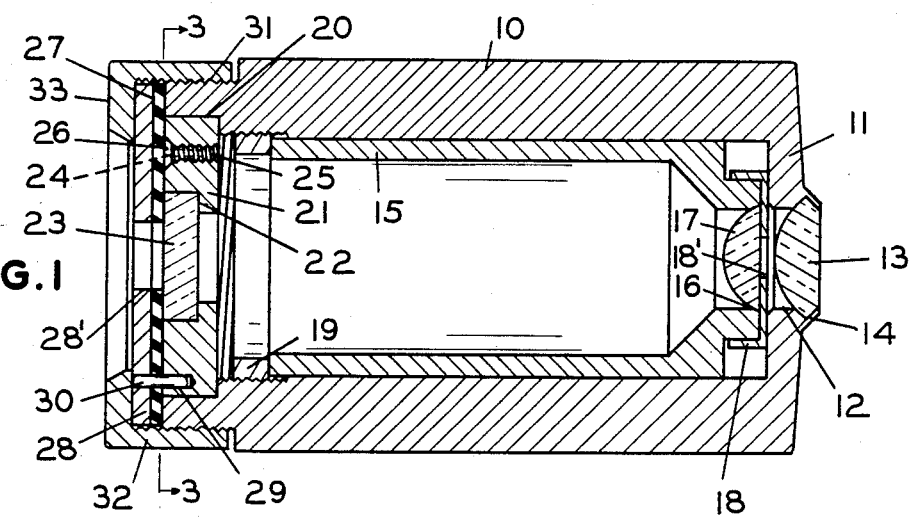
Fig. 1 is a vertical section of a lens mount embodying my invention.
Figure 2:
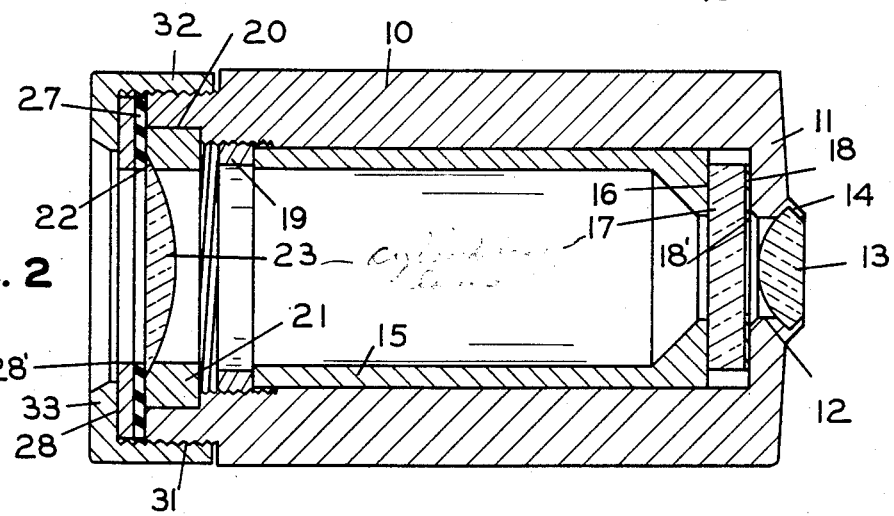
Fig. 2 is a horizontal section thereof.
Figure 3:
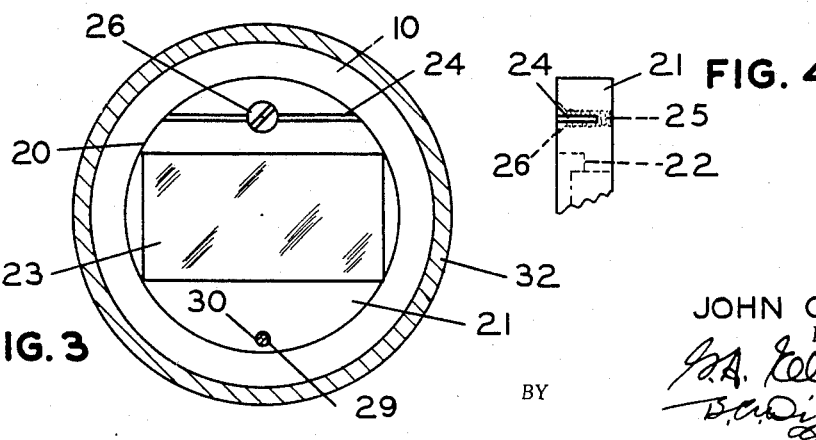
Fig. 3 is a section taken on line 3—3 of Fig. 1.
Figure 4:
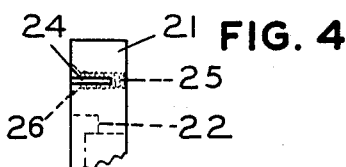
Fig. 4 is a fragmentary detail view of the rear lens seating member.

A preferred embodiment of my invention is illustrated in the drawing wherein 10 designates a lens tube which is closed at one end by a plate 11. The plate 11 has a central aperture 12 in which the spherical lens 13 is secured as by the spun or burnished rim 14. The lens 13 thus spun or burnished into the aperture 12 forms an oil and moisture proof closure therefor.

A second tube 15 is slidable within the tube 10 and has at its forward end a lens seat 16 within which is seated a cylindrical lens 17. A diaphragm plate 18 having an aperture 18' is placed over the forward end of the tube 15 and a lock ring 19 threaded into the tube 10 forces the tube 15 toward the plate 11 thus locking the lens 17 and diaphragm plate 18 in position.

The rear end of the tube 10 has a short cylindrical bore 20 for receiving the lens seating disk 21. The lens seating member or disk 21 is provided with a seat 22 for receiving a cylindrical lens 23 and also has a deep slot 24 adjacent one edge. A screw 25 having a tapered head 26 is threaded into the member or disk 21 at the slot 24 in such a way that the head 26 will spread the sides of the slot 24 to cause a tight frictional engagement between the member or disk 21 and the sides of the bore 20. This mechanism for securing the seating member 21 avoids any tendency toward turning the member 21 and lens 23 as would be the case if a threaded lock ring were used.

After the cylindrical lens 23 has been properly oriented and the seating member 21 locked in position, an oil proof gasket 27 and a diaphragm 28 having an aperture 28' are placed in proper position over the lens 23. A hole 29 is then drilled through the diaphragm 28 and through the gasket 27 into the seating member 21 and a pin 30 locks these three against relative rotation. The rear end of the tube 10 has a reduced portion 31 upon which a ring 32 is threaded. This ring 32 has an inwardly extending flange 33 which engages the diaphragm 28 and causes it to compress the gasket 27.

From the foregoing, it will be apparent that I am able to attain the objects of my invention and provide a new and improved lens mount which is both oil and moisture proof. Various modifications can, of course, be made without departing from the spirit of my invention or the scope of the appended claims.

I claim:

1. In a device of the character described, a lens tube having a cylindrical bore, a cylindrical seating member loosely mounted within said bore, a cylindrical lens carried by said seating member, said member having a deep slot adjacent one edge thereof and perpendicular to the cylinder axis of said lens, and a screw threaded into said member at said slot and having a tapered head engaging the sides of said slot to spread it so that the member will tightly engage the bore.

2. A lens mount of the type described comprising a lens tube, an apertured front wall secured on said tube, a lens secured in the aperture of said front wall in oil tight relation thereto, a second lens tube telescopically mounted within the first-named tube, a lens carried by said second tube, means for clamping said second tube in predetermined position, a lens seating member mounted in the rear end of the first lens tube, a lens in said seating member, means carried by said member for clamping the member in adjusted position, an oil proof gasket and a clamping ring threaded on the outside of the first-named tube for pressing said gasket against said member and said tube.

3. In a device of the character described, a first lens tube, an apertured plate fixed at the front end of said tube, a lens mounted in the aperture of said plate, a second lens tube slidably mounted in said first lens tube, a second lens mounted in said second lens tube, a diaphragm plate between the second lens tube and said front plate, means for forcing said second lens tube toward said front plate, a lens seat secured in the rear end of said first lens tube, a third lens in said seat, an oil proof gasket overlying the end of said first tube, the face of said lens seat and a portion of the face of said third lens, a second diaphragm plate substantially coextensive with said gasket and a ring threaded on said first tube and having an internal flange engaging the second diaphragm plate to cause said plate to compress said gasket.

4. A lens mount comprising a tube having a cylindrical bore, a cylindrical seating member loosely mounted within said bore coaxially therewith, a lens carried by said seating member, said member having a deep slot adjacent one edge and substantially parallel to the axis of the bore and means for spreading the edges of said slot to cause said member to engage the inner wall of the bore.

5. A lens mount comprising a tube having a cylindrical bore, a cylindrical seating member loosely mounted in said bore coaxially therewith, a cylindrical lens, means for mounting said cylindrical lens on said member with its axis substantially perpendicular to the axis of the bore, said member having a deep slot adjacent one edge and substantially parallel to the axis of said bore and means for spreading the edges of said slot to force the member into frictional engagement with the inner wall of the bore.

JOHN C. SABEL.